(12) United States Patent
Tran et al.

(10) Patent No.: US 7,796,987 B2
(45) Date of Patent: Sep. 14, 2010

(54) APPARATUS, AND ASSOCIATED METHOD, FOR SYNCHRONIZING A MOBILE STATION WITH A RADIO NETWORK

(75) Inventors: Phat Tran, Waterloo (CA); Sean Simmons, Waterloo (CA)

(73) Assignee: Research In Motion Limited, Waterloo (CA)

( * ) Notice: Subject to any disclaimer, the term of this patent is extended or adjusted under 35 U.S.C. 154(b) by 801 days.

(21) Appl. No.: 11/674,800

(22) Filed: Feb. 14, 2007

(65) Prior Publication Data
US 2008/0194256 A1  Aug. 14, 2008

(51) Int. Cl.
G06F 15/16 (2006.01)

(52) U.S. Cl. .................. 455/434; 455/403

(58) Field of Classification Search .......... 455/434, 455/403, 436, 442, 522
See application file for complete search history.

(56) References Cited
U.S. PATENT DOCUMENTS 7,236,746 B2 * 6/2007 Peric ................. 455/67.11
2002/0197997 A1 * 12/2002 Attar et al. ............. 455/446
2004/0087276 A1 * 5/2004 Attar et al. ............. 455/63.4
2005/0148333 A1 * 7/2005 Buckley .............. 455/435.2
2006/0030362 A1 * 2/2006 Fukuda ................ 455/561
2007/0109985 A1 * 5/2007 Wiedeman et al. ....... 370/316
2007/0254652 A1 * 11/2007 Khan et al. ........... 455/435.1

* cited by examiner

Primary Examiner—Sam Bhattacharya

(57) ABSTRACT

Apparatus, and an associated method, for facilitating synchronization of a mobile station with a radio network in a GSM/EDGE-compatible, cellular communication system. The FCCH is monitored to obtain positional and frequency offset information. Once obtained, the information is used to obtain SCH burst information broadcast upon an SCH. Monitoring of the FCCH continues while the SCH burst information is detected and decoded. If additional FCCH control information is detected that has an associated quality metric value that is better than the quality metric value associated with earlier FCCH, control information, the newly-received information is used to detect the SCH burst information, absent successful decoding of the SCH burst information.

23 Claims, 3 Drawing Sheets

APPARATUS, AND ASSOCIATED METHOD, FOR SYNCHRONIZING A MOBILE STATION WITH A RADIO NETWORK

The present invention relates generally to a manner by which to synchronize a mobile station, such as GSM/EDGE-capable mobile station, with a corresponding radio network. More particularly, the present invention relates to apparatus, and an associated method, for synchronizing the mobile station in a manner in which a set of control channels is concurrently monitored until the information required to synchronize the mobile station is successfully detected.

Unlike conventional synchronization schemes that sequentially monitor the set of channels, concurrent monitoring permits sharing of detected information that provides for quicker synchronization, less prone to synchronization failure.

BACKGROUND OF THE INVENTION

The use of radio communications systems to communicate is pervasive in modern society. At least part of the communication path extending between a set of communication stations in a radio communication system is defined upon a radio link. Use of the radio link frees the communication stations from the conventional requirement of a wireline communications system that a fixed wireline connection extend along the entire communication path between the communication stations. Improved communication mobility is provided, and the use of a radio link permits communication stations to be positioned and used at locations at which wireline connections would be impractical.

A cellular communication system is an exemplary type of radio communication system. Successive generations of communication systems have been developed and deployed. And, their use is widespread, sometimes having penetration levels that approach, or exceed, those of conventional wireline networks. While, initially, cellular communication systems were used primarily for voice communications, increasingly, cellular communication systems are used to effectuate data communication services. In a typical cellular communication system, a mobile station is used through which to communicate. The mobile station communicates with a network part of the communication system that, in turn, is connected to a PSTN (public-switched, telephonic network) or a data network, such as the Internet.

Channel allocations are made to a mobile station to permit its communication pursuant to some types of communication sessions. The allocation of channels typically involves exchange of signaling between the mobile station and the radio network with which the mobile station communicates. Signaling is used, not only pursuant to channel allocation, but also, importantly, to synchronize the mobile station with the radio network. Particularly when digital communication techniques are used, time synchronization of the mobile station with the network is critical. Without appropriate synchronization of the mobile station with the network, communications are generally unable to be carried out adequately. Accordingly, cellular communication systems provide schemes by which to permit the synchronization of a mobile station with a network with which the mobile station is to communicate.

For instance, in a GSM/EDGE (global system for mobile communications/enhanced data for GSM evolution)—compliant, cellular communications system, both a FCCH (frequency correction channel) and SCH (synchronization channel) are defined. Control signals broadcast by the network upon such defined channels are detected by the mobile station and used by the mobile station pursuant to synchronization of the mobile station with the network. Existing methods generally utilize a sequential procedure, that is, a procedure in which the FCCH is first monitored and in which, thereafter, the SCH is monitored.

In one conventional scheme, for instance, the two-step, sequential monitoring is carried out. A problem sometimes results due to false detections made when monitoring the FCCH. Positional and frequency offset information is broadcast on the FCCH. This information is needed to obtain additional information from the SCH. If the FCCH information is erroneous, a false detection results. That is to say, when the erroneous information is used to monitor the SCH to obtain SCH burst information broadcast thereon, the SCH burst information shall correspondingly be erroneous, and, presumptively, decoding of the obtained SCH burst information is unsuccessfully carried out. Upon determination that the SCH burst information is unsuccessfully decoded, the procedure is repeated. The FCCH is again monitored, again to obtain positional and frequency offset information that is then used pursuant to SCH monitoring to detect, obtain, and decode the SCH burst information.

In another conventional scheme, false, i.e., erroneous, FCCH detections, and their associated problems, are reduced. In this scheme, the two-stage, FCCH search-then-SCH-decode procedure is performed only to find the first ARFCN (absolute radio frequency channel number), of the network. Once the ARFCN and is obtained, a frequency offset of the network is derived. And, an assumption is made that the subsequent ARFCNs all have the same frequency offset. Subsequent synchronization attempts bypass the FCCH monitoring and detection steps. Instead, a search is directly made at the SCH or the SCH burst information. As the SCH burst is structurally more complex than that of the FCCH burst, false detections are less likely to occur. However, the search on the SCH for the SCH burst information fails if the ARFCNs have large frequency offsets from one another.

An improved manner by which to synchronize a mobile station to the radio network would therefore be advantageous.

It is in light of this background information related to synchronization of a mobile station to a radio network that the significant improvements of the present invention have evolved.

DETAILED DESCRIPTION

Figure 1:
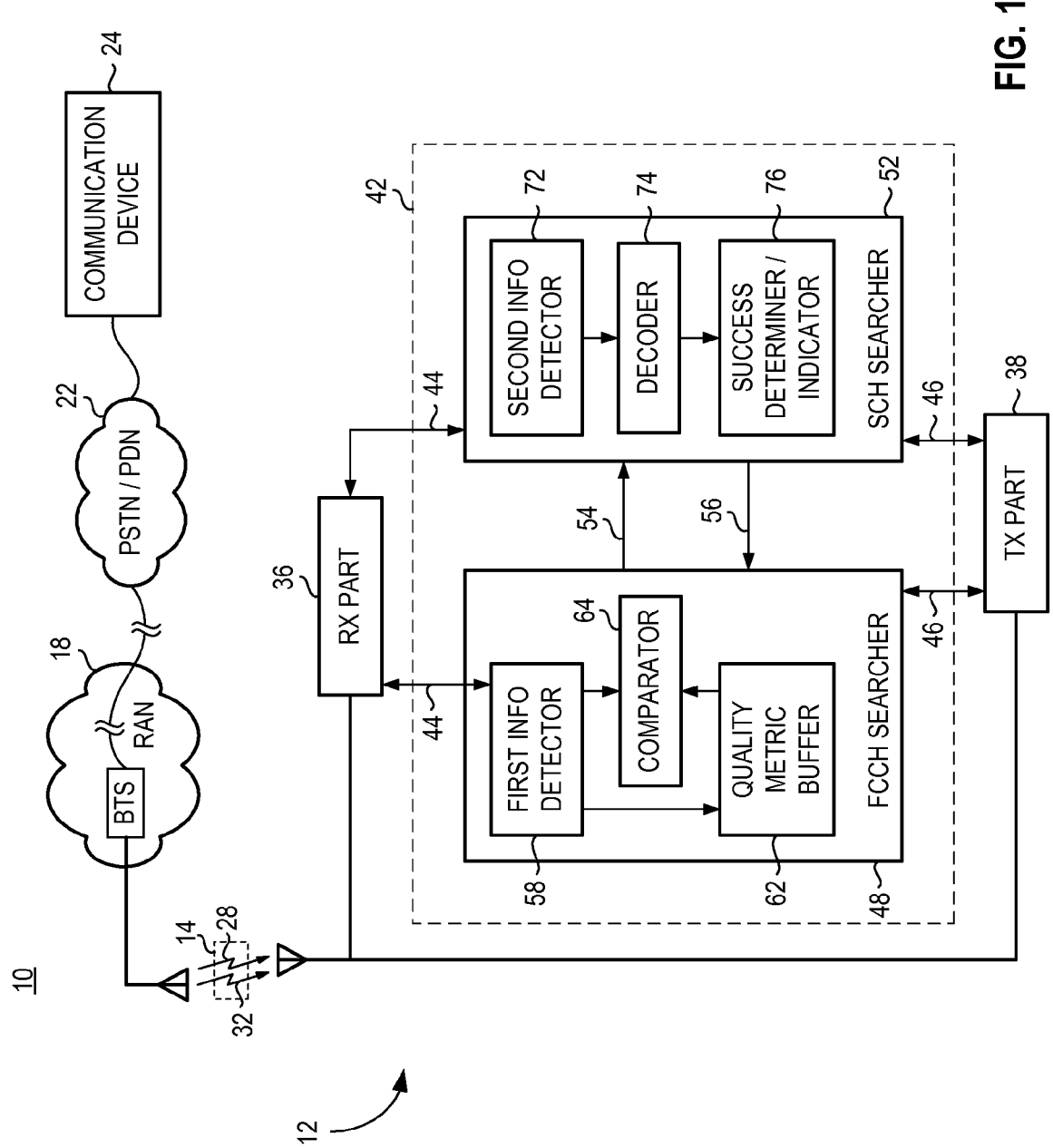
FIG. 1 illustrates a functional block diagram of a radio communications system in which an embodiment of the present invention is operable.

The present invention, accordingly, advantageously provides apparatus, and an associated method, by which to synchronize a mobile station, such as a GSM/EDGE-capable mobile station with a radio network.

Through operation of an embodiment of the present invention, a manner is provided for synchronizing the mobile station by concurrently monitoring a set of control channels until the information required to synchronize the mobile station is successfully detected.

In one aspect of the present invention, concurrent monitoring permits sharing of detected information that provides for quicker synchronization, less prone to synchronization failure.

In another aspect of the present invention, synchronization is provided for a GSM/EDGE-capable mobile station with a corresponding radio network. The mobile station concurrently monitors both the FCCH and the SCH upon which synchronization information is broadcast. Bidirectional communication between separate entities at the mobile station that monitor the respective channels is provided so that the information gathered through the monitoring of each of the channels is usable by the entity monitoring the other of the channels.

A first entity, an FCCH searcher, formed of a search function, monitors the FCCH. First-channel information, positional and frequency offset information, is detectable by the FCCH searcher. And, once detected, the information is selectively provided to the entity that monitors the SCH. Subsequent to providing the detected information to the other entity, the FCCH searcher continues to monitor the FCCH to detect synchronization information broadcast thereon. The FCCH searcher selectively sends subsequently-detected, i.e., second-detected, synchronization information on the FCCH, to provide the other searching entity with the new first synchronization information.

In another aspect of the present invention, a quality metric is associated with each of the first synchronization information indicia detected by the FCCH searcher. Subsequent to detection of a first-detected, first synchronization information indicia and its forwarding on to the other searching entity, subsequently-detected, first synchronization information indicia is forwarded on to the other searching entity if the quality metric associated therewith is better than the quality metric associated with the earlier-forwarded, first synchronization information indicia.

A comparator, or other function compares the quality metric associated with a new, first synchronization information indicia with that of a stored quality metric value. And, responsive to the comparison, decision is made as to whether to forward on the new, first synchronization information indicia to the other searching entity. The quality metric is definable, and derivable, in any of various manners, for instance, through determination of confidence levels associated with detected values.

In another aspect of the present invention, and the SCH searcher monitors the SCH. The SCH searcher utilizes the first synchronization information indicia detected by the FCCH searcher in its monitoring of the SCH. The first synchronization information indicia provided by the FCCH searcher provides positional and frequency offset information to the SCH searcher. The SCH searcher uses this information to monitor a corresponding position and frequency offset of the SCH. And, detected values are decoded, such as by a decoder that forms a portion of the SCH searcher, or other searching functionality. In the event that the decoding of the SCH synchronization information is successful, the information is used to synchronize the mobile station with the network, and the synchronization process is completed. If the SCH synchronization information is not successfully decoded, the FCCH searcher is alerted to the decoding failure, and the FCCH searcher sends subsequently-obtained, first synchronization information indicia to the SCH searcher, irrespective of whether the quality metric of the information indicia is better than a prior-sent synchronization information indicia. And, the SCH searcher uses the newly-provided indicia to obtain again the SCH synchronization information that is, once again, decoded. If the decoding is successful, the information is used to synchronize the mobile station with the network. Otherwise, the process repeats until a time period times out.

Because of the concurrent operation of the searching of both the FCCH and the SCH, delays associated with false FCCH detects, i.e., erroneous first synchronization information indicia, are more easily corrected, in a more timely manner. And, synchronization is also readily performed even when ARFCs that exhibit large frequency offsets from one another.

In these and other aspects, therefore, apparatus, and an associated method, is provided for facilitating synchronization of a mobile station. A first channel searcher is adapted to receive indications of signals sent to a mobile station upon a first channel. The first channel searcher is configured to detect broadcast of first control information upon the first channel. And, the first channel searcher is configured selectively to generate a first-detected indication of the first control information and, selectively, to generate a second-detected indication of the first control information. A second channel searcher is adapted to receive indications of signals sent to the mobile station upon a second channel. The second channel searcher is configured, responsive to detection made by the first channel searcher, to detect broadcast of second control information. The first channel searcher and the second channel searcher are concurrently operable.

Turning first, therefore, to FIG. 1, a radio communication system, shown generally at 10, provides for radio communications with mobile stations, of which the mobile station 12 is representative. Two-way communication of data is provided by way of radio channels defined upon a radio air interface 14 defined between the radio network and the mobile station. The radio network includes a radio access network (RAN) part 18. The RAN part is coupled to an external network, here illustrated at a single entity 22 but representative of a PSTN (public-switched, telephonic network) or a packet data network (PDN). A communication device 24, forming a communication endpoint, is connected to the external network 22. The communication device represents an originating communication station or a terminating communication station for communications with a mobile station, such as the mobile station 12. Data is routed through the network portions 22 and 18 and upon the radio air interface to communicate the data to the mobile station and in the reverse direction to communicate data originated at the mobile station for delivery to the communication device 24.

As mentioned previously, the mobile station must be synchronized with the network part in order for the mobile station properly to be able to communicate therewith pursuant to a communication session. Synchronization schemes are used by which to synchronize the mobile station with the network part such that, once synchronized, the mobile station is able to send and to receive data to effectuate a communication service. In the exemplary implementation, the radio access network part 18 and the mobile station 12 are operable in general conformity with a GSM/EDGE (Global System for Mobile Communications/Enhanced Data for GSM Evolution) operating protocols. And, pursuant to such operating protocols, a frequency correction channel (FCCH) 28 and a synchronization channel (SCH) 32 are defined upon the radio air interface 14. The network part generates control information that is broadcast on the respective channels 28 and 32. Included amongst the control information broadcast on the respective channels is control information usable by the mobile station to synchronize itself with the network. Specifically, the control information broadcast on the FCCH includes synchronization burst information comprising positional and frequency offset indicia. The positional and frequency offset indicia is usable by the mobile station to locate an SCH burst broadcast on the SCH. Such information is broadcast in an existing GSM/EDGE-compatible system, and details of the broadcast information can be found in an appropriate operating specification pertaining thereto.

The mobile station includes transceiver circuitry, here represented by a receive (RX) part 36 and a transmit (TX) part 38. The transceiver circuitry operates in conventional manner to transceive data with the network part of the communication system, such as pursuant to effectuation of a communication service with a communication endpoint, such as that represented by the communication device 24.

The mobile station further includes apparatus 42 that operates pursuant to an embodiment of the present invention to facilitate synchronization of the mobile station with the network part, here, specifically, to monitor first and second control information broadcast upon first and second control channels, i.e., the FCCH and the SCH. The apparatus is formed of functional entities, implementable in any desired manner, including, in part or in their entireties, by algorithms executable by processing circuitry or their equivalents. The apparatus is positionable in communication conductivity, represented by the lines 44 and 46, with the receive part and transmit part, respectively, forming the transceiver circuitry of the mobile station. While operation of the apparatus 42 shall be described with respect to its exemplary implementation in a GSM/EDGE-compatible system, more generally, the apparatus facilitates synchronization of other types of communication devices in which synchronization information is sent on a set of channels for use to synchronize the mobile station with the network with which the mobile station communicates.

The apparatus includes first and second searchers, an FCCH searcher 48 and an SCH searcher 52. The searchers 48 and 52 are in communication connectivity with the receive part 36 to receive indications of signals detected by the receive part. The searchers 48 and 52 are concurrently operable, and the searchers are bidirectionally coupled together, here represented by the lines 54 and 56. The FCCH searcher functionality operates to detect first control information broadcast on the FCCH. Detection functionality of the searcher 48 is represented by the first control information detector 58. In the exemplary implementation, the first control information broadcast on the FCCH forms first synchronization information indicia comprising positional indicia and frequency offset indicia. The detected information also has a quality metric associated therewith. The quality metric that is calculated at the FCCH searcher or is otherwise provided thereto. The quality metric is determined in any appropriate manner, such as by confidence levels associated with the detected values, and presents a quality indicia associated with the detected values.

A buffer 62 selectively buffers values associated with the detected information detected by the detector 58. The searcher 48 further includes a comparator 64 that compares a quality metric value with a buffered, if any, value. When a first detection is made, the buffer is empty, and the quality metric value associated with the first-detected information is better than a default value of an empty buffer. And, the results of the comparison made by the comparator causes the detected information to be provided, by way of the line 54 to the SCH searcher 52. And, the results of the comparison causes the quality metric value associated with the detected information detected by the detector 58 to be buffered at the quality metric buffer.

The SCH searcher utilizes the information provided thereto, namely, positional and frequency offset information, to search for second control information on the SCH channel, the position and frequency offset of which is determinative of the search. The searcher interacts with, or is otherwise embodied together with the receive part 36 to cause the SCH to be appropriately monitored. The second control information detector 72 is representative of the detection of the SCH information on the SCH. Detected values are provided to the decoder 74. The decoder 74 operates to decode the values detected by the detector to attempt to decode an SCH burst formed of the detected values. A success determiner and indicator 76 operates to determine whether the decoding of the detected information is successful. That is to say, the determiner 76 determines whether the SCH burst has been successfully decoded. If so, the SCH burst is used to synchronize the mobile station with the network part. Otherwise, if decoding is determined not to have been successfully completed, the determiner and indicator generates an indication that is returned, by way of the line 56, to the SCH searcher 48. When delivered to the searcher 48, the indication is used to reset the value buffered at the quality metric buffer.

Even after delivering a first-detected control information indicia to the SCH searcher, the FCCH searcher continues searching operations to detect additional control information broadcast on the FCCH 28. When additional information is detected, the quality metric associated therewith is determined, or otherwise provided to the searcher. And, the quality metric value of this second-received, or more generally, subsequently-received, information is compared with a buffered value buffered at the buffer 62 by the comparator 64. If the quality metric value of the newly-detected information is better than the buffered quality metric value, then the comparator causes the detected information to be forwarded, by way of the line 54, to the SCH searcher 52. And, the SCH searcher uses the newly-received information pursuant to searching operations on the SCH.

Because the FCCH searcher continues to perform searching operations for better first-detected information indicia even after a first-detected information indicia is provided to the SCH searcher, failures in SCH burst discovery resulting from false first-detected information indicia are avoided. This robustness against false first-detected information indicia further ensures that the FCCH search need not be bypassed for fear of false first-detected information indicia sabotaging the SCH search, permitting synchronization to occur on ARFCNs with large frequency offsets from one another.

Figure 2:
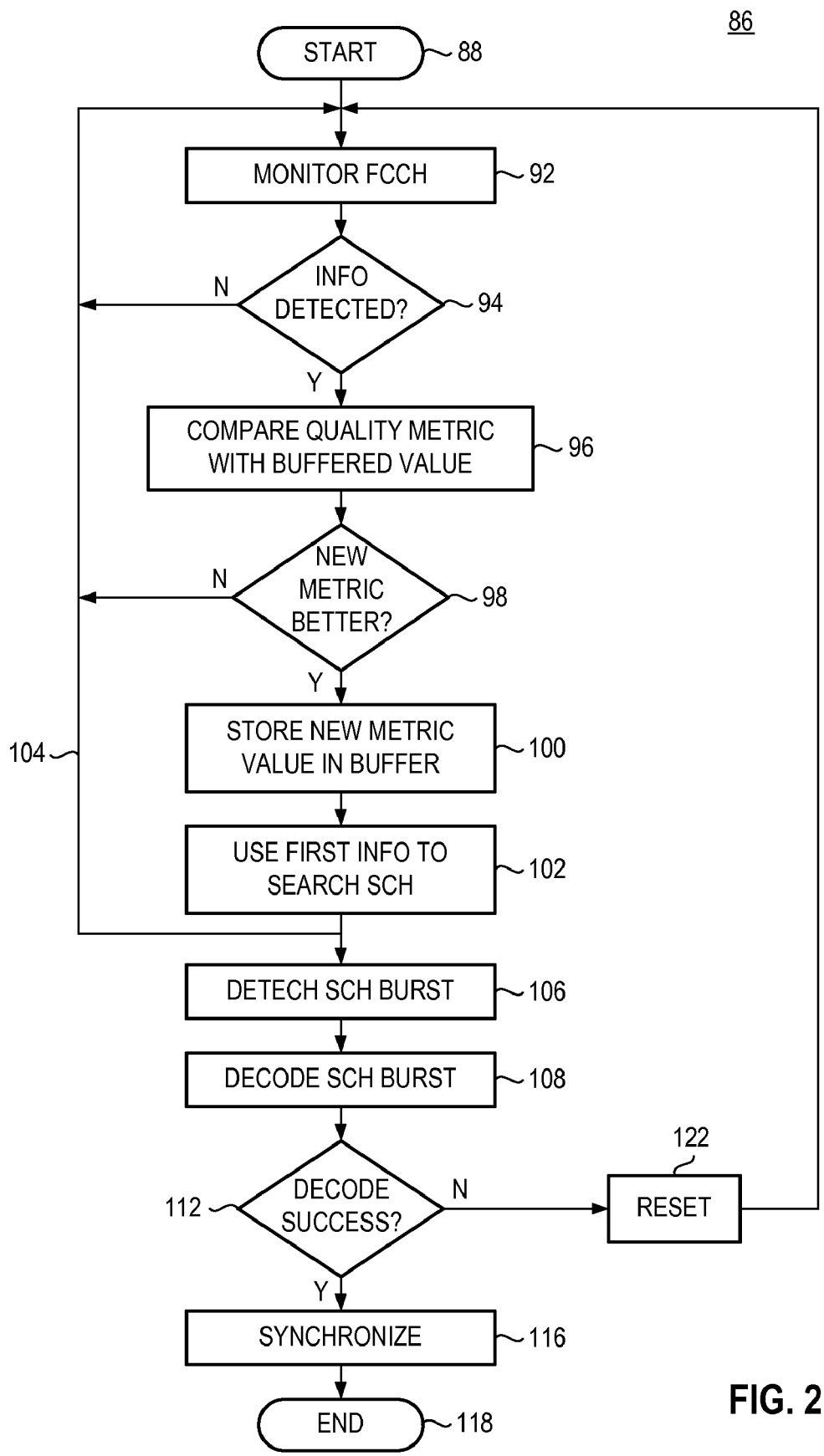
FIG. 2 illustrates a sequence diagram representative of signaling broadcasts and synchronization of a mobile station responsive thereto pursuant to an embodiment of the present invention.

FIG. 2 illustrates a process diagram, shown generally at 86, representative of the process of operation of an embodiment of the present invention. After entry, indicated by the start block 88, a first control channel, the FCCH, is monitored, indicated by the block 92.

Then, and as indicated by the decision block 94, a determination is made as to whether control information is detected. If not, the no branch is taken back to the block 92, and monitoring of the control channel continues. Otherwise, if control information is detected, the yes branch is taken to the block 96.

At the block 96, an associated quality metric, associated with the detected control information, is compared with a buffered value, if any. Then, and as indicated by the decision block 98, a determination is made as to whether the quality metric value is better than the buffered value. A better value is, e.g., a higher quality value. If not, the no branch is taken back to the block 92, and the first control channel is continued to be monitored. Otherwise, the yes branch is taken to the block 100 and a new metric value is stored in a buffer. Then, at the block 102, the detected control information is used to monitor the SCH. Additionally, in parallel to the monitoring of the SCH, the FCCH is continued to be monitored, indicated by the path 104, extending back to the block 92.

Then, and as indicated by the block 106, an SCH burst is detected. And, as indicated by the block 108, the detected burst is decoded. A determination is made, at the decision block 112, as to whether the decoding is successful. If decoding is successful, the yes branch is taken to the block 116, synchronization is performed, and the process ends, indicated by the end block 118.

If, conversely, the decoding is unsuccessful, the no branch is taken from the decision block 112 to the block 122. At the block 122, the buffer at which the quality metric value is stored, is reset, and a path is taken back to the block 92 whereat monitoring of the FCCH continues.

Figure 3:
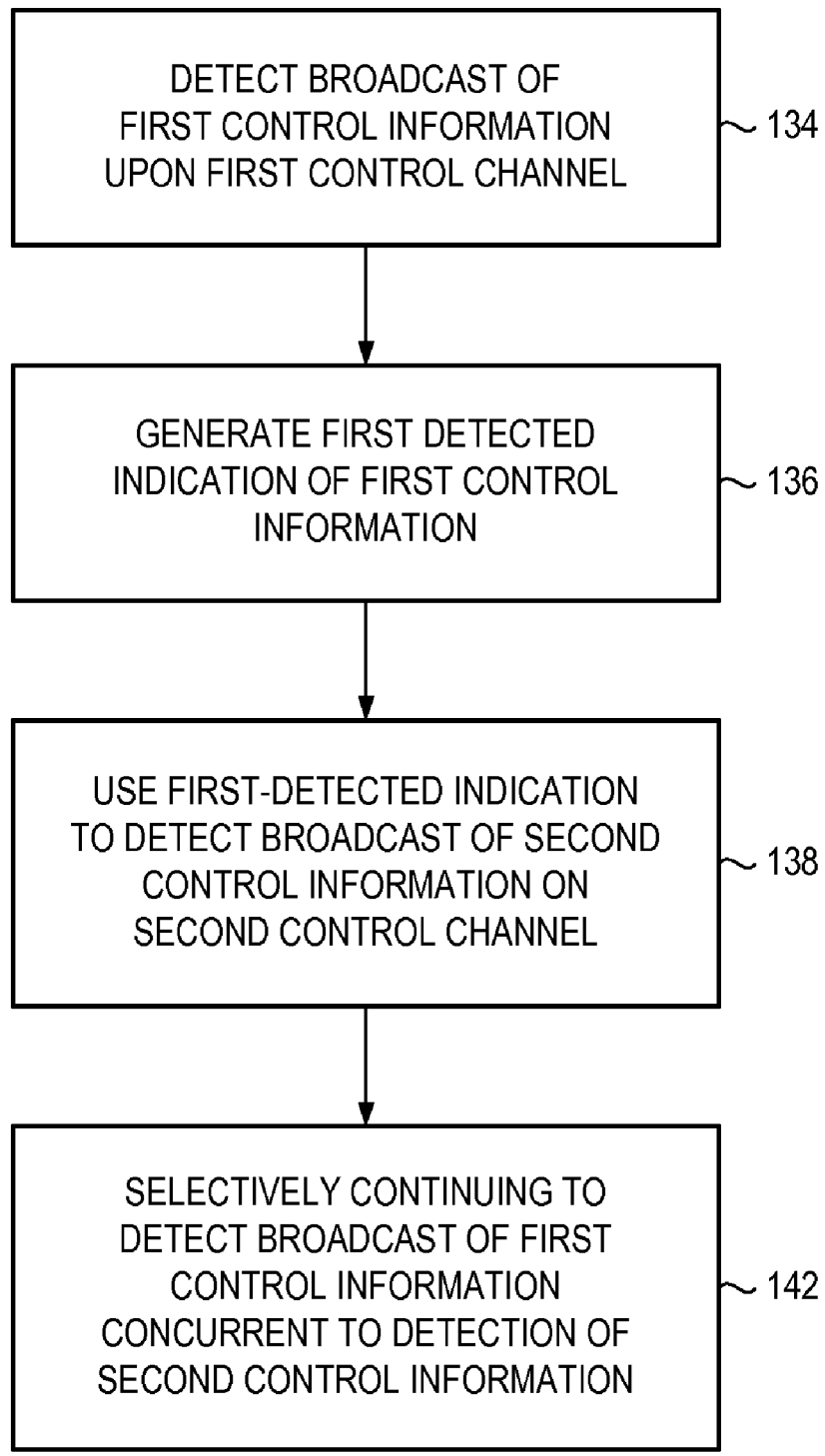
FIG. 3 illustrates a method flow diagram representative of the method of operation of an embodiment of the present invention.

FIG. 3 illustrates a method flow diagram, shown generally at 132, representative of the method of operation of an embodiment of the present invention. The method facilitates synchronization of a mobile station.

First, and as indicated by the block 134, broadcast of first control information upon a first control channel is detected. Then, and as indicated by the block 136, a first-detected indication of the first control information is generated.

Then, and as indicated by the block 138, the first-detected indication is used to detect broadcast of second control information upon a second control channel. And, and as indicated by the block 142, broadcast of the first control information is selectively continued to be detected concurrent to be detection of the broadcast of the second control information.

Thereby, searching on the first control channel and searching on the second control channel are performed in parallel, rather than sequentially. Results are shared that facilitate recovery from false detects on the first control channel. Searching on the first control channel is not bypassed, providing further advantage to operation of the method of an embodiment of the present invention.

What is claimed is:

1. Apparatus for facilitating synchronization of a mobile station, the apparatus comprising:
    a first channel searcher adapted to receive indications of signals sent to the mobile station upon a first channel, the first channel searcher configured to detect broadcast of a first instance of first control information upon the first channel and the first channel searcher configured selectively to generate a first-detected indication of the first instance of the first control information and to detect broadcast of a second instance of the first control information upon the first channel and, selectively, to generate a second-detected indication of the first control information; and
    a second channel searcher adapted to receive indications of signals sent to the mobile station upon a second channel, the second channel searcher configured responsive to the first-detected indication made by the first channel searcher, to detect broadcast of second control information concurrent with the first channel searcher detecting the broadcast of the second instance of the first control information upon the first channel.

2. The apparatus of claim 1 wherein the second channel searcher further comprises a decoder configured to decode the second control information.

3. The apparatus of claim 2 wherein success of decoding of the second control information is, in part, determinative of whether the second-detected indication of the first control information is generated.

4. The apparatus of claim 3 wherein the second channel searcher further comprises an indicator configured to indicate whether the decoder of the second channel searcher successfully decodes the second control information.

5. The apparatus of claim 1 wherein the first channel searcher further comprises a quality metric indicator configured to indicate a quality metric associated with the first control information of which an indication thereof is generated by the first channel searcher.

6. The apparatus of claim 5 wherein the first channel searcher is configured selectively to generate the second-detected indication if the first control information and the quality metric associated therewith is better than the quality metric associated with the first-detected indication.

7. The apparatus of claim 6 wherein the first channel searcher is configured to generate the second-detected indication of the first control information absent indication of successful detection by the second channel searcher of the second control information.

8. The apparatus of claim 1 wherein the mobile station comprises a Global System for Mobile Communications-Enhanced Data for GSM Evolution (GSM-EDGE) capable mobile station, and wherein the first channel upon which the first channel searcher detects broadcast of the first control information and the second channel upon which the second channel searcher detects broadcast of the second control information comprise GSM-EDGE defined channels.

9. The apparatus of claim 8 wherein the GSM-EDGE defined channel forming the first control channel comprises a frequency correction channel (FCCH) and wherein the GSM-EDGE defined channel forming the second control channel comprises a synchronization channel (SCH).

10. The apparatus of claim 1 wherein indication generated by the first channel searcher of the first control information identifies a second-channel position and a frequency offset.

11. The apparatus of claim 1 further comprising a selector configured to select whether to cause the first channel searcher to generate the second-detected indication, selection made by the selector responsive, in part, to whether the second channel searcher successfully detects the second control information.

12. The apparatus of claim 11 wherein selection made by the selector is further responsive, in part, to a time-based factor.

13. The apparatus of claim 11 wherein selection made by the selector is further responsive, in part, to a quality-based factor.

14. A method for facilitating synchronization of a mobile station, the method comprising the operations of:
    detecting broadcast of a first instance of first control information upon a first control channel;
    generating a first-detected indication of the first control information;
    using the first-detected indication to detect broadcast of second control information upon a second control channel;
    selectively detecting broadcast of a second instance of the first control information concurrent to detection of the broadcast of the second control information during the operation of using the first-detected indication.

15. The method of claim 14 selectively further comprising the operations of:

generating a second-detected indication of the first control information; and using the second-detected indication to detect broadcast of second control information upon the second control channel.

16. The method of claim 15 further comprising the operation of selecting whether to perform the operation of generating the second-detected indication.

17. The method of claim 16 wherein selection is made, during the operation of selecting, to perform the operation of generating absent indication of successful detection, during the operation of using the first-detected indication.

18. The method of claim 16 wherein selection is made, during the operation of selecting, to forego performance of the operation of generating the second-detected indication upon successful detection, during the operation of detecting, of the second control information.

19. The method of claim 14 further comprising the operation of maintaining a quality metric associated with the first control information.

20. Network-synchronization apparatus for a mobile station, the network synchronization apparatus comprising:
  a first channel searcher configured to search for first and second instances of first synchronization information broadcast upon a first control channel; and
  a second channel searcher bidirectionally coupled to the first channel searcher and operable in parallel therewith, the second channel searcher configured to search for second synchronization information broadcast upon a second channel, searching on the second channel using the first instance of first synchronization information found by the first channel searcher concurrent with searching by the first channel searcher for second instances of first synchronization information absent indication of successful detection by the second channel searcher of the second synchronization information.

21. A method for facilitating synchronization of a mobile station that operates in a communication system that has a frequency correction channel (FCCH) and a synchronization channel (SCH) the method comprising the operations of:
  searching for FCCH control information on the FCCH to detect first-detected FCCH information indicia;
  searching for SCH control information, making use of the fast-detected FCCH information, on the SCH to detect SCH information indicia; and
  concurrent with the searching for SCH control information, searching for FCCH control information on the FCCH to detect second-detected FCCH indicia absent successful detection of the SCH information indicia.

22. The apparatus of claim 1 wherein the second channel searcher is further configured, responsive to the first-detected indication, to detect broadcast of second control information concurrent with the first channel searcher selectively generating the second-detection indication.

23. The method of claim 14 wherein the operation of selectively detecting broadcast of a second instance of the first control information further comprises the operation of selectively generating second-detected indication of the first control information concurrent to detection of the broadcast of the second control information.

* * * * *